`US006019615A`

United States Patent [19]
Masuda

[11] Patent Number: 6,019,615
[45] Date of Patent: Feb. 1, 2000

[54] CONSTRUCTION OF AND METHOD OF PROCESSING END PORTION OF SHIELDED CABLE

[75] Inventor: Satoki Masuda, Shizuoka, Japan

[73] Assignee: Yazaki Corporation, Tokyo, Japan

[21] Appl. No.: 09/176,206

[22] Filed: Oct. 21, 1998

[30] Foreign Application Priority Data

Oct. 21, 1997 [JP] Japan ..................................... 9-288780

[51] Int. Cl.⁷ .................................................... H01R 4/66
[52] U.S. Cl. ............................................ 439/99; 174/65.55
[58] Field of Search .............................. 439/98, 99, 610; 174/65.55, 88 C

[56] References Cited

FOREIGN PATENT DOCUMENTS

| 6-260246 | 9/1994 | Japan | ........................... | H01R 13/648 |
| 8-45575 | 2/1996 | Japan | ................................ | H01R 9/05 |

*Primary Examiner*—Neil Abrams
*Assistant Examiner*—Javaid Nasri

*Attorney, Agent, or Firm*—Sughrue, Mion, Zinn, Macpeak & Seas, PLLC

[57] ABSTRACT

A shielded cable (1) includes a conductor (2), an inner insulating sheath (3) covering the conductor (2), a braid (4) provided around the inner insulating sheath (3), and an outer insulating sheath (5) covering the braid (4). An end portion of the outer insulating sheath (5) and an exposed portion of the braid (4), disposed adjacent to the end portion of the outer insulating sheath (5), are covered with an annular shield stopper (11) in such a manner that the shield stopper extends over the outer insulating sheath and the braid. An annular pressing portion (19) of a shield terminal (12) is inserted between the braid (4) and the inner insulating sheath (3). The shield stopper (11) is pressed, thereby simultaneously forming a first pressed portion (28) and a second pressed portion (29) at the shield stopper, the first pressed portion being pressed into the outer insulating sheath (5) while the second pressed portion is pressed into the braid (4).

4 Claims, 7 Drawing Sheets

CONSTRUCTION OF AND METHOD OF PROCESSING END PORTION OF SHIELDED CABLE

BACKGROUND OF THE INVENTION

1. Field of the Invention

The present invention relates to a construction of and a method of processing an end portion of a shielded cable.

The present application is based on Japanese Patent Application No. Hei. 9-288780, which is incorporated herein by reference.

2. Description of the Related Art

FIG. 6 shows a conventional shielded cable end-processing construction analogous to those disclosed in Unexamined Japanese Patent Publication Nos. Hei. 6-260246 and Hei. 8-45575.

An outer insulating sheath 5 is stripped or removed from an end portion of a shielded cable 1 so as to expose a braid 4, and further an inner insulating sheath 3 is stripped so as to expose a conductor 2, and in this condition the shielded cable 1 is subjected to a processing. An annular stopper ring 6 is pressed to grip that portion of the outer insulating sheath 5 disposed adjacent to the exposed braid 4, and a tubular shield terminal 7 is pressed to grip the braid 4, thus effecting the predetermined processing.

The shield terminal 7 comprises an annular pressing portion 7a for being pressed (or compressed) into contact with the braid 4, and an annular contact portion 7b extending from the annular pressing portion 7a for contact with a shield contact (not shown) or a terminal of a mating connector (not shown). In FIG. 6, reference numeral 8 denotes a shield pipe which is mounted, together with the shield terminal on the shielded cable 1, and reference numeral 9 denotes a rubber plug which is mounted on the outer insulating sheath 5 for waterproof purposes.

Next, a conventional shielded cable-processing method will be described with reference to FIG. 7.

As shown in FIG. 7A, the stopper ring 6 is fitted on the shielded cable 1, and in this condition the shielded cable 1 is horizontally held on a setting jig 10 as shown in FIG. 7B.

The setting jig 10 comprises a pair of upper and lower dies 10a and 10b, and the stopper ring 6 is supported on the lower die 10b, and in this condition the upper die 10 is moved downward to press or compress the stopper ring 6. As a result of this pressing operation, the stopper ring 6 bites into the outer insulating sheath 5 to thereby increase the strength of connection between the outer insulating sheath 5 and the braid 4, so that the outer insulating sheath 5 and the braid 4 are prevented from axial displacement with respect to each other.

Thereafter, the waterproof plug 9 is press-fitted on the shielded cable 1, and the shield pipe 8 and the shield terminal 7 are located on the exposed portion of the braid 4. First, as shown in FIG. 7C, the shield pipe 8 is moved into engagement with the end of the outer insulating sheath 5, and is disposed on the outer periphery of the braid 4, and then, as shown in FIG. 7D, the shield terminal 7 is moved into engagement with the end of the outer insulating sheath 5. At this time, the shield terminal 7 pushed to be disposed inwardly of the braid 4, that is, between the braid 4 and the inner insulating sheath 3.

After this mounting operation, a pressing force is applied to the outer surface of the shield pipe 8. As a result of this pressing operation, the braid 4 is firmly held between the shield pipe 8 and the annular pressing portion 7a of the shield terminal 7, so that the braid 4 and the shield terminal 7 are connected together. At the same time, the annular pressing portion 7a of the shield terminal 7 bites into the inner insulating sheath 3, so that the shield terminal 7 is fastened or fixed to the shielded cable 1. At this time, the shield pipe 8, provided on the outer periphery of the braid 4, protects the braid 4 from being torn or cut by the pressing force.

In the conventional end-processing method, however, the braid 4 and the shield terminal 7 must be connected together, and in addition it is necessary to prevent the outer insulating sheath 5 and the braid 4 from displacement with respect to each other, and in order to prevent this displacement, the stopper ring 6 is used. And besides, during the connection of the shield terminal 7 to the braid 4, it is necessary to prevent the braid 4 from being torn or damaged by the pressing force, and therefore the shield pipe 8 is used. Thus, many component parts are required, and the number of the parts is increased.

Furthermore, after the stopper ring 6 is pressed (or compressed), the shield pipe 8 and the shield terminal 7 are pressed, thus requiring the two pressing operations in all, and the number of the steps of the processing is increased, and much time is required.

And besides, the shielded cable 1 mist be horizontally held by the use of the setting jig 10 since the stopper ring 6 can not be easily fixed in position on the shielded cable 1. Thus, the setting jig 10 is needed for the processing of the shielded cable 1.

After the stopper ring 6 is mounted on the shielded cable, the rubber plug 9 is fitted on the shielded cable, and is moved toward the braid 4, and therefore there is encountered a disadvantage that the rubber plug 9, when to be mounted on the shielded cable, is liable to interfere with the stopper ring 6, and may be damaged by this interference.

SUMMARY OF THE INVENTION

An object of the present invention is to provide a construction of and a method of processing an end portion of a shielded cable, in which the number of component parts is reduced, and the number of pressing operations is reduced, and the use of a setting jig is not necessary, and damage to a rubber plug is prevented.

According to the first aspect of the present invention, there is provided a construction of processing an end portion of a shielded cable, the construction comprises: a cable including a conductor, an inner insulating sheath covering the conductor, a braid provided around the inner insulating sheath, and an outer insulating sheath covering the braid, in which an end portion of the braid is exposed; an annular shield stopper mounted on and extending over an end portion of the outer insulating sheath and the end portion of the braid, the shield stopper including a first pressed portion that presses the end portion of the outer insulating sheath, and a second pressed portion that presses the end portion of the braid; and a shield terminal comprising an annular pressing portion which is located between the braid and the inner insulating sheath, the annular pressing portion including a third pressed portion that presses the inner insulating sheath; in which the braid is sandwiched between the second pressed portion and the third pressed portion. In this construction, the outer insulating sheath and the braid of the shielded cable are covered with the annular shield stopper, and in this condition, the shield stopper is pressed or compresses, thereby simultaneously forming the pressed portion, pressed into the outer insulating sheath, and the pressed portion pressed into the braid. As a result of the formation of the first pressed portion pressed into the outer insulating sheath, the outer insulating sheath and the braid are prevented from axial displacement with respect to each other. As a result of the formation of the second pressed portion pressed into the braid, the braid is firmly held between the shield stopper and the annular pressing portion of the shield terminal, and therefore the braid and the shield terminal are connected together, and also the annular pressing portion of the shield terminal bites into the inner insulating sheath of the shielded cable, so that the shield terminal is fixed to the shielded cable. At this time, the braid will not be torn or damaged by the pressing force since the shield stopper covers the outer periphery of the braid to protect the same. In this construction, the single shield stopper serves to prevent the outer insulating sheath and the braid from axial displacement with respect to each other, and also serves to prevent the braid from being damaged by the pressing force, and therefore a stopper ring and a shield pipe, heretofore required for achieving these functions, are not necessary, and the number of the component parts is reduced. The pressed portion, serving to prevent the displacement of the outer insulating sheath and the braid with respect to each other, and the pressed portion, serving to connect the braid and the shield terminal together, can be formed by one pressing operation, and therefore the number of the pressing operations is reduced.

According to the second aspect of the present invention, the shield stopper may include an annular larger-diameter portion covering an end portion of the cable, an annular smaller-diameter portion covering the end portion of the braid, and a step portion interconnecting the larger-diameter portion and the smaller-diameter portion, the step portion being abutted against an end surface of the end portion of the outer insulating sheath to position the shield stopper. In this construction, the shield stopper is positioned relative to the shielded cable by the abutment of the step portion (formed at the boundary between the larger-diameter portion and the smaller-diameter portion) against the end surface of the outer insulating sheath, and the shield stopper can be pressed relative to the shielded cable in the predetermined position. Therefore, any jig for positioning the shield stopper is not required.

According to the third aspect of the present invention, there is provided a method of processing an end portion of a cable, comprising steps of: providing a cable comprising a conductor, an inner insulating sheath covering the conductor, a braid provided around the inner insulating sheath, and an outer insulating sheath covering the braid, wherein an end portion of the braid is exposed; an annular shield stopper; and a shield terminal comprising an annular pressing portion; mounting the shield stopper on the cable such that the shield stopper covers an end portion of the outer insulating sheath and the end portion of the braid; inserting the pressing portion of the shield terminal between the braid and the inner insulating sheath; and pressing the shield stopper so that the outer insulating sheath and the braid are simultaneously pressed through the shield stopper. In this method, the shield stopper, covering the outer insulating sheath and the braid, is pressed or compressed, and by doing so, the pressing for preventing the displacement of the outer insulating sheath and the braid with respect to each other, and the pressing for connecting the braid and the shield terminal together, can be effected simultaneously. Therefore, these pressed portions can be formed by one pressing operation, and the number of the pressing operation is reduced, and the processing can be carried out rapidly.

According to the fourth aspect of the present invention, the method according to the third aspect, further comprises a step of mounting a rubber plug on the outer insulating sheath so that the rubber plug is held in intimate contact with an outer peripheral surface of the outer insulating sheath, before the step of mounting. Before the shield stopper is mounted, the rubber plug is mounted, and therefore the rubber plug will not interfere with the other parts in contrast with the case where the rubber plug is mounted in a later step. Therefore, the rubber plug will not be damaged.

DETAILED DESCRIPTION OF THE PREFERRED EMBODIMENT

Figure 1:
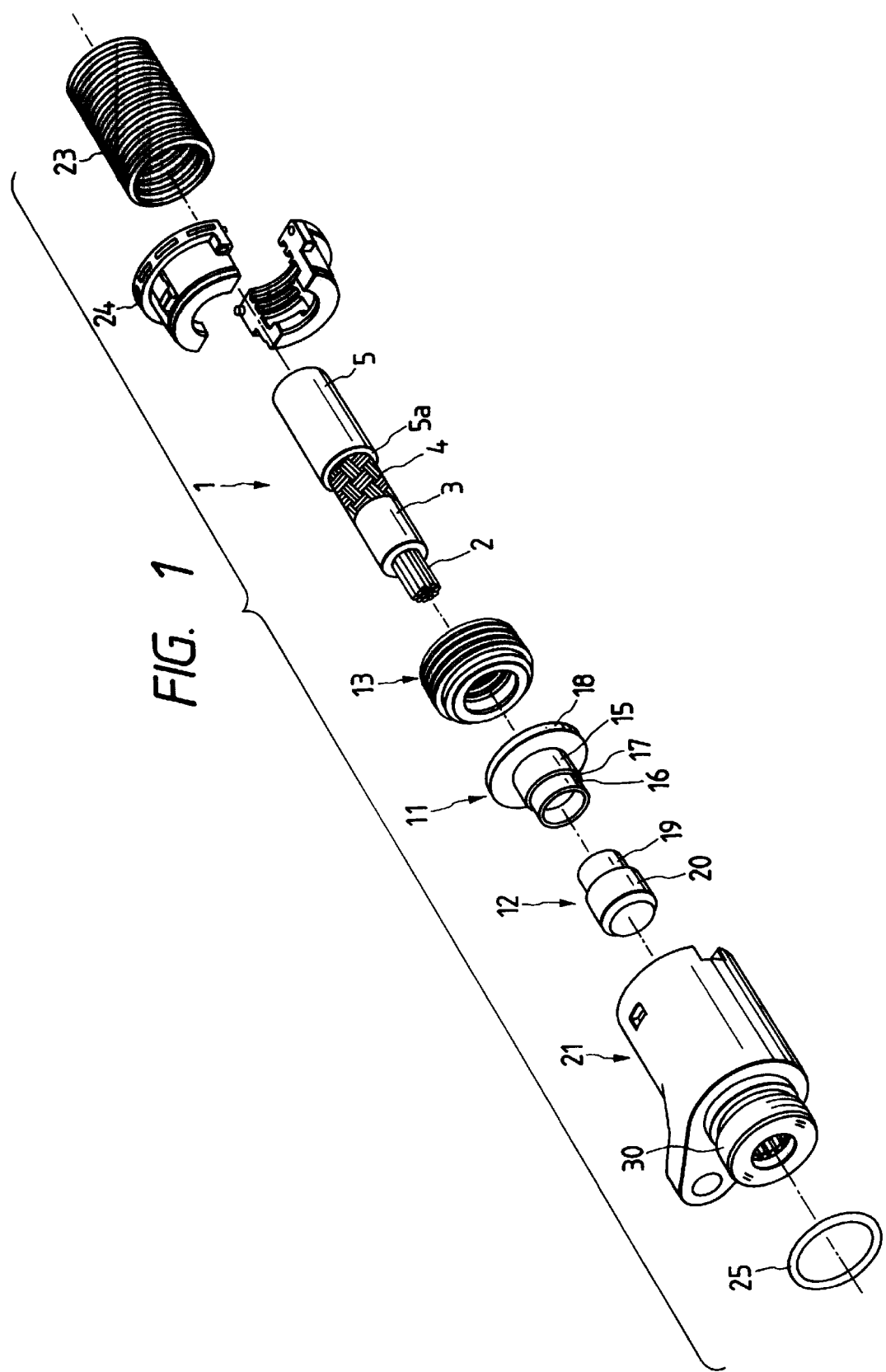
FIG. 1 is an exploded, perspective view of one preferred embodiment of the present invention, showing a condition before an end processing is effected.
Figure 2A:
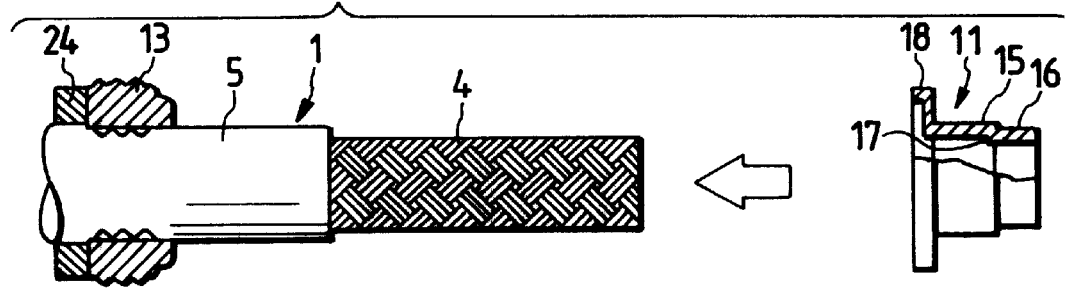
FIGS. 2A to 2D show the end processing of this embodiment in the order of steps thereof, FIG. 2A being a cross-sectional view showing the step of mounting a shield stopper, FIG. 2B a cross-sectional view showing a condition after the step of mounting the shield stopper, FIG. 2C a cross-sectional view showing the step of mounting a shield terminal, and FIG. 2D a cross-sectional view showing the pressing step.
Figure 2B:
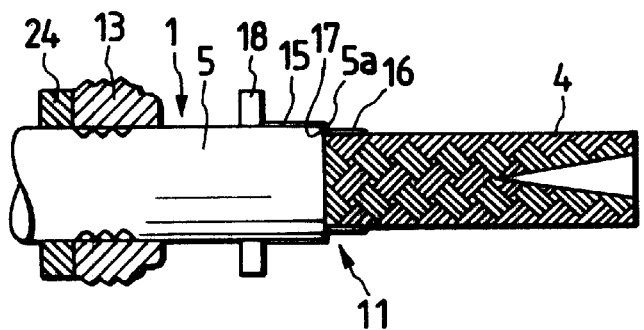
Figure 2C:
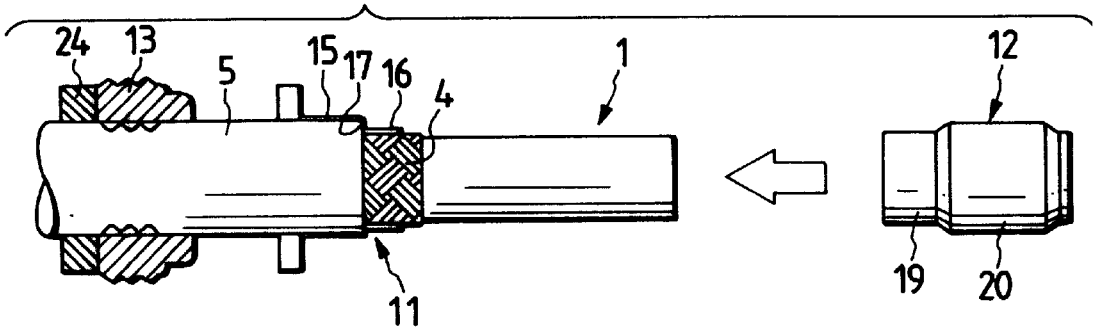
Figure 2D:
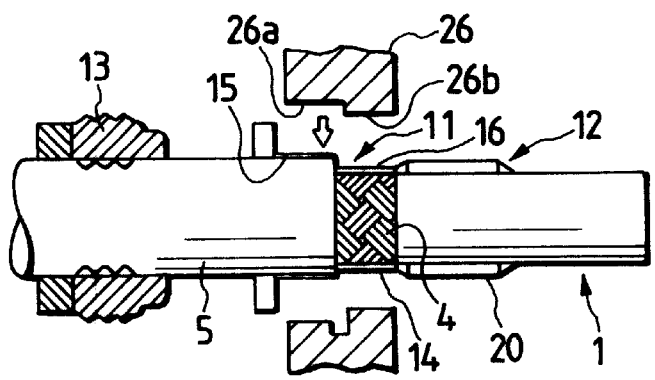
Figure 3A:
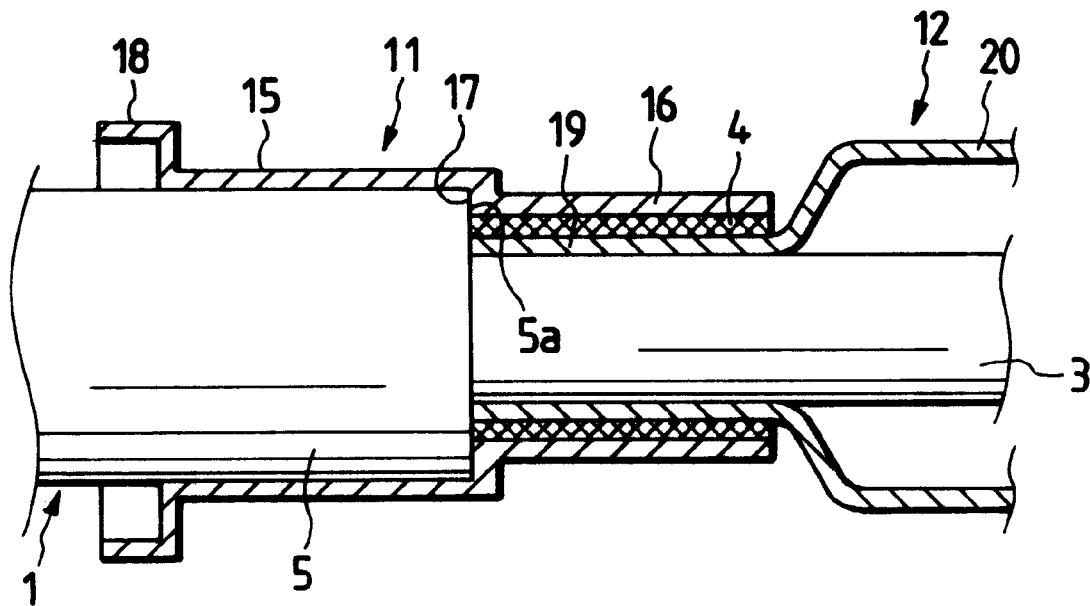
FIGS. 3A and 3B show an important portion of this embodiment, FIG. 3A being a cross-sectional view showing the step of inserting the shield terminal, and FIG. 3B being a cross-sectional view showing a condition after the pressing step.
Figure 3B:
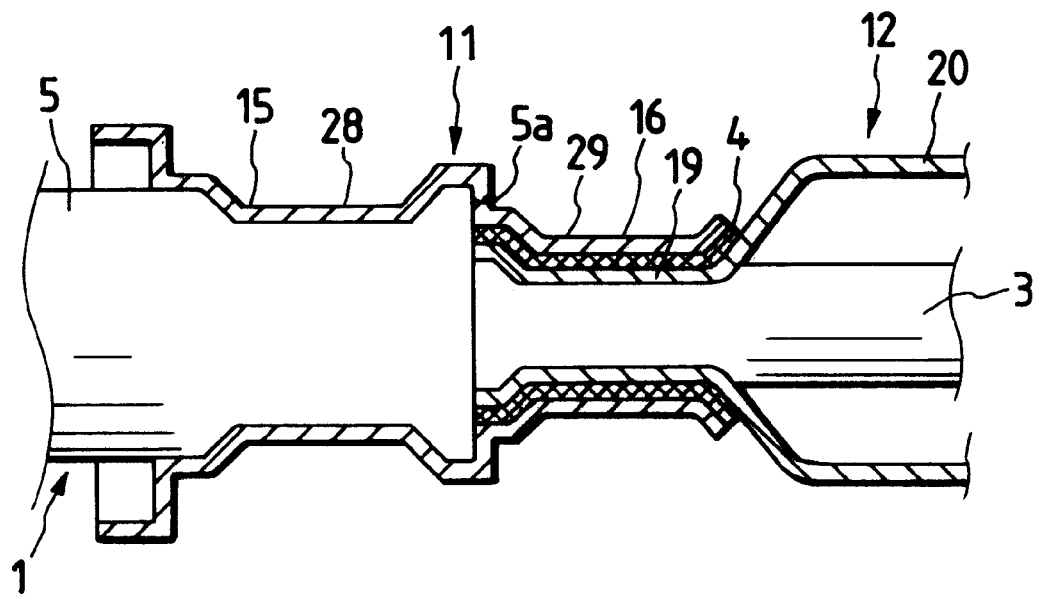

FIG. 1 is an exploded, perspective view of one preferred embodiment of the present invention, showing a condition before it is mounted in a housing, FIGS. 2A to 2D, as well as FIGS. 3A and 3B, are cross-sectional views showing an assembling operation in the order of steps thereof. A construction of this embodiment comprises a shielded cable 1, a shield stopper 11, a shield terminal 12 and a rubber plug 13.

The shielded cable 1 comprises a conductor 2, an inner insulating sheath 3 covering the conductor 2, a braid 4 provided around the inner insulating sheath 3, and an outer insulating sheath 5 covering the braid 4. The outer insulating sheath 5 is stripped or removed from an end portion of the shielded cable 1 so as to expose at least the braid 4, and in this condition the shielded cable 1 is subjected to an end processing. The outer insulating sheath 5, subjected to stripping, has an end surface 5a at an end thereof.

Figure 4:
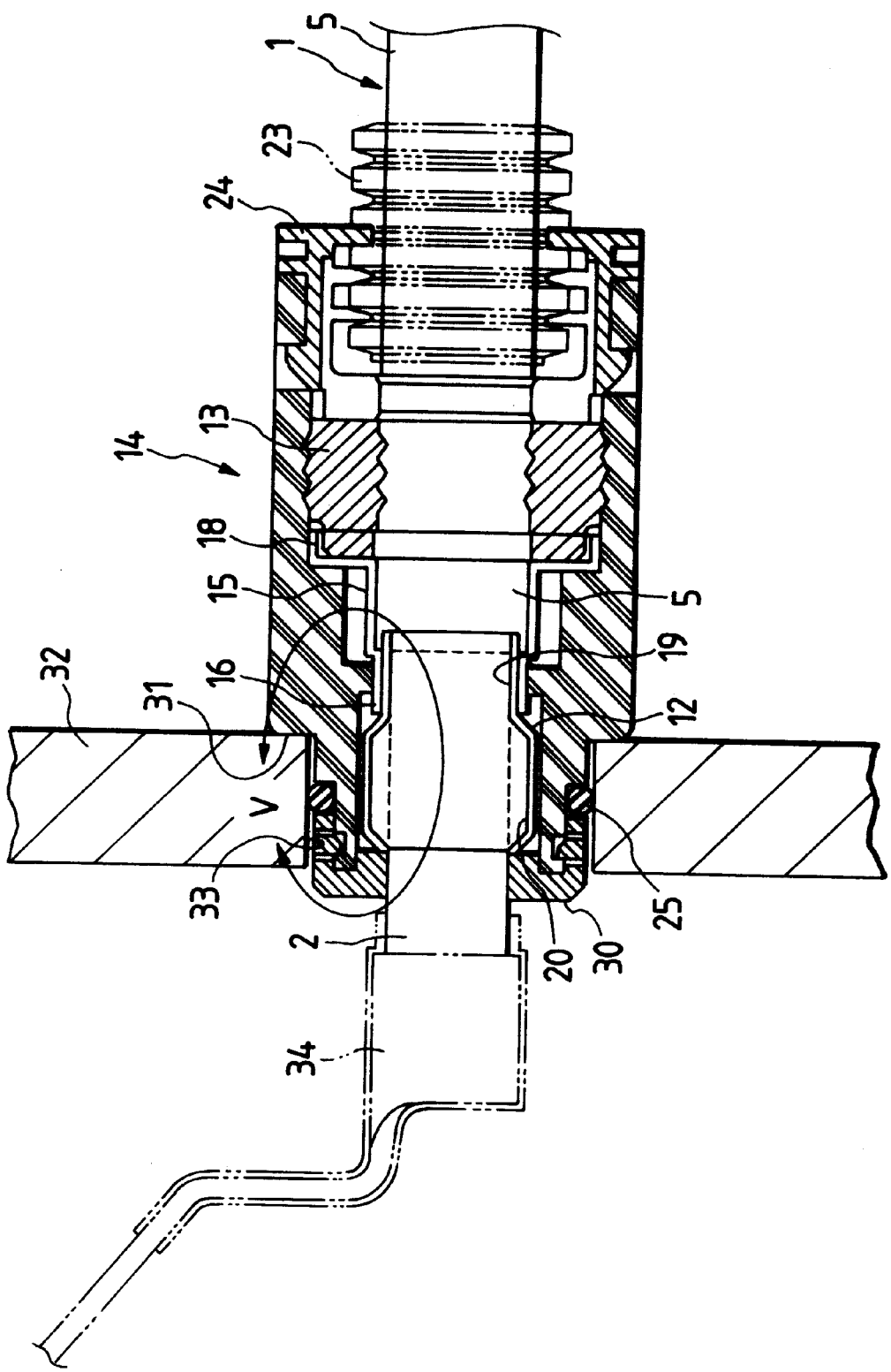
FIG. 4 is a cross-sectional view of a connector produced using a shielded cable subjected to the end processing.

The shielded cable 1 of this embodiment is designed to transmit a large amount (e.g. 100 A or 200 A) of electric current, and the conductor 2 comprises a bundle of electric wires each having a relatively large diameter. A connector 14, having the end portion of the shielded cable 1 received therein, is mounted directly on an electric equipment, as shown in FIG. 4.

The shield stopper 11 is made of electrically-conductive metal, and includes a larger-diameter portion 15, and a smaller-diameter portion 16 extending from the larger-diameter portion 15. The larger-diameter portion 15 and the smaller-diameter portion 16 have an annular shape, and the shield stopper 11 is mounted on the shielded cable 1, with the larger-diameter portion 15 fitted on the shielded cable 1. A step portion 17 is formed at the boundary between the larger-diameter portion 15 and the smaller-diameter portion 16, and interconnects the two portions 15 and 16. A flange 18 is formed at a free end of the larger-diameter portion 15 remote from the smaller-diameter portion 16, and this flange 18 is larger in diameter than the larger-diameter portion 15.

As shown in FIGS. 2 and 3, the larger-diameter portion 15 of the shield stopper 11 covers the end portion of the outer insulating sheath 5 of the shielded cable 1, and therefore has an inner diameter generally equal to the outer diameter of the outer insulating sheath 5. The smaller-diameter portion 16 covers the exposed portion of the braid 4 disposed adjacent to the end of the outer insulating sheath 5. Therefore, the inner diameter of the smaller-diameter portion 16 is generally equal to the outer diameter of the braid 4. The flange 18 receives a front end portion of the rubber plug 13, as shown in FIG. 4.

The shield terminal 12 includes an annular pressing portion 19, and an annular contact portion 20 extending from the annular pressing portion 19, and is made of electrically-conductive metal, and has a tubular shape as a whole. The shield terminal 12 is connected to the braid 4 of the shielded cable 1 so as to ground the shielded cable 1.

When the shield stopper 11 is pressed or compressed, the annular pressing portion 19 of the shield terminal 12 is pressed together with the shield stopper 11 as will be more fully described later. As a result of this pressing operation, the annular pressing portion 19 is joined and connected to the braid 4 of the shielded cable 1, and also bites into the inner insulating sheath 3. Therefore, the annular pressing portion 19 is inserted between the braid 4 and the inner insulating cover 3.

Figure 5:
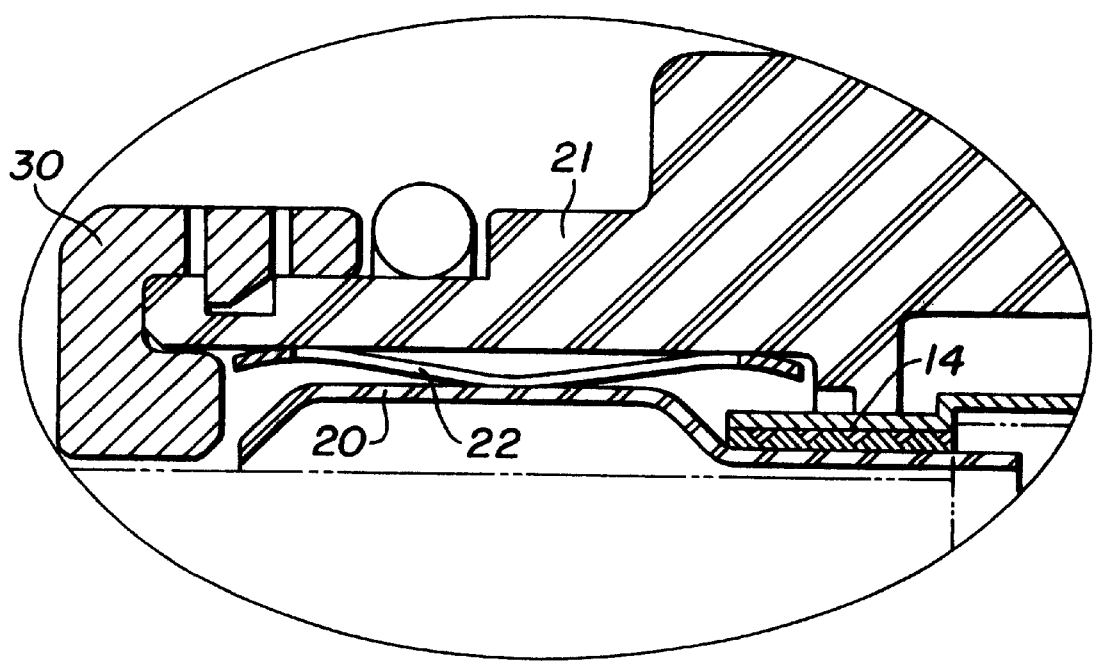
FIG. 5 is an enlarged view of a portion V of FIG. 4.
Figure 6:
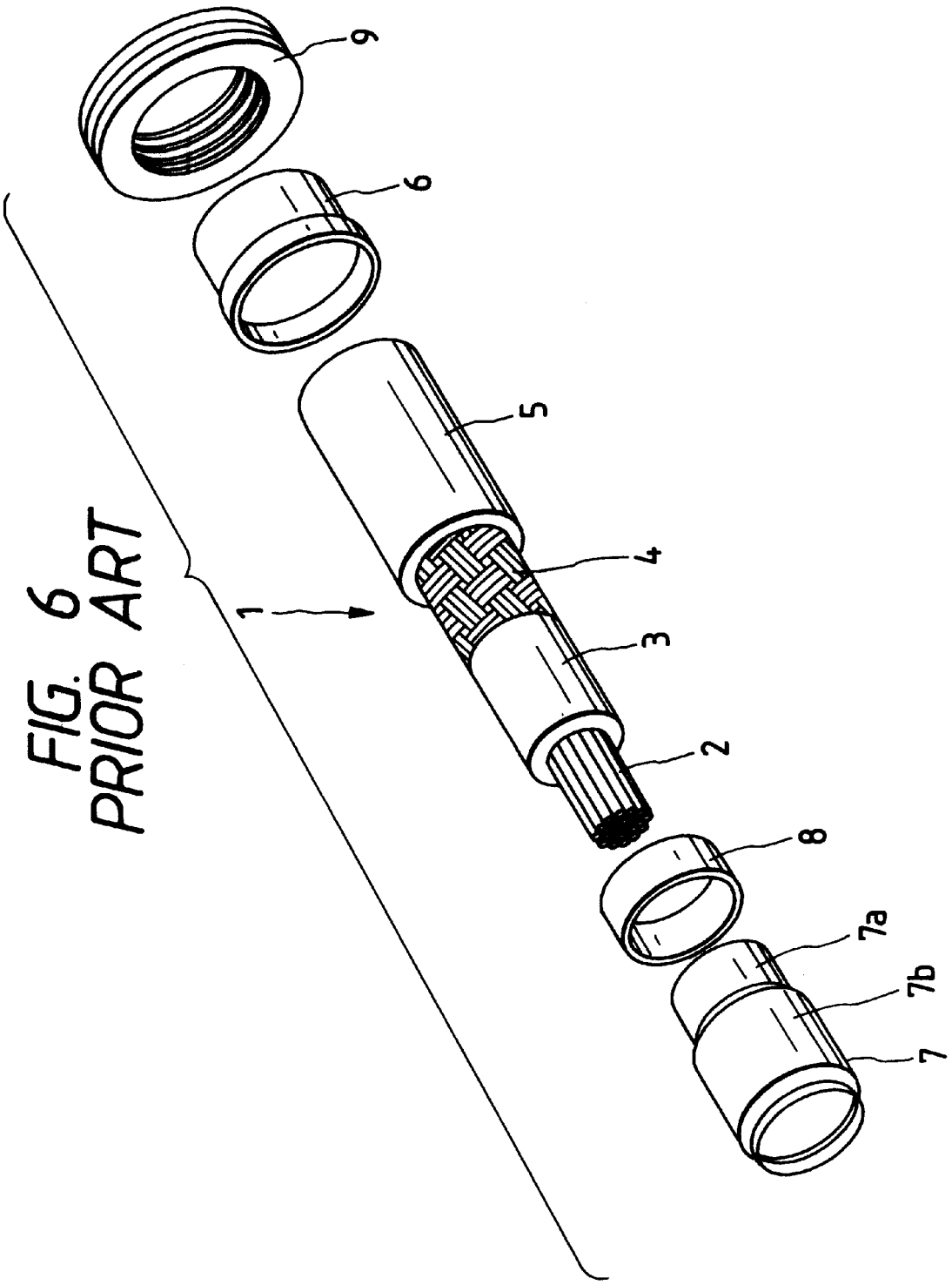
FIG. 6 is an exploded, perspective view showing a conventional end processing.
Figure 7A:
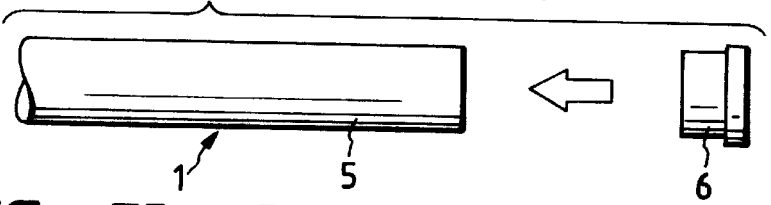
FIGS. 7A to 7E are cross-sectional views showing the conventional end processing in the order of steps thereof.
Figure 7B:
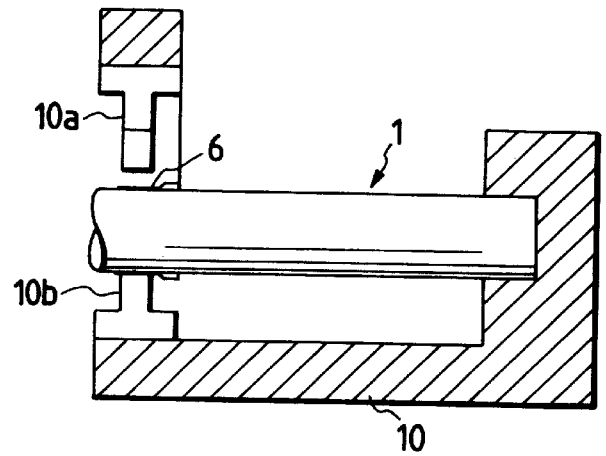
Figure 7C:
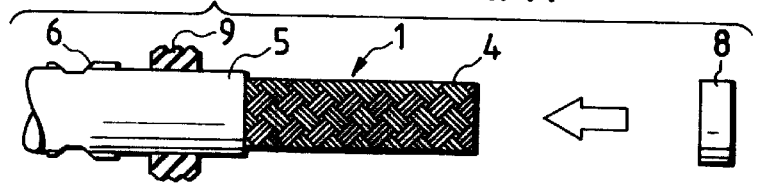
Figure 7D:
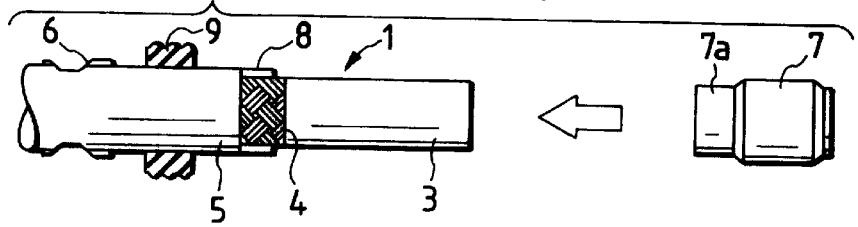
Figure 7E:
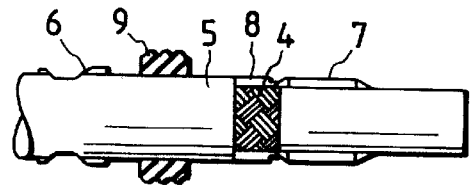

As shown in FIG. 5, the annular contact portion 20 contacts a shield contact 22 provided within the housing 21 of the connector 14 so as to ground the shielded cable through the shield contact 22.

The rubber plug 13 is press-fitted on the shielded cable 1, and is held in intimate contact with the outer peripheral surface of the outer insulating sheath 5 of the shielded cable 1, as shown in FIGS. 2 and 4. This intimate contact imparts a waterproof effect to the connector 14.

In addition to the above construction, a corrugated tube 23 is mounted on the shielded cable 1. As shown in FIG. 4, this corrugated tube 23 is inserted into a corrugate holder 24 mounted at a rear end portion of the housing 21 of the connector 14, and is held in position. In FIG. 1, reference numeral 25 denotes a seal ring fitted in the housing 21.

The end processing in this embodiment will now be described with reference to FIGS. 2 and 3. First, the rubber plug 13 is press-fitted on the shielded cable 1, and is held in intimate contact with the outer peripheral surface of the outer insulating sheath 5 as shown in FIG. 2A. After the rubber plug 13 is thus mounted, the shield stopper 11 is mounted on the shielded cable 1. For mounting the shield stopper 11 on the shielded cable 1, the larger-diameter portion 15 is directed toward the shielded cable 1, and then the shielded cable 1 is passed through the shield stopper 11.

The passage of the shielded cable 1 through the shield stopper 11 is stopped when the end surface 5a of the outer insulating sheath 5 abuts against the step portion 17 of the shield stopper 11, as shown in FIG. 2B. As a result of abutment of the step portion 17 against the end surface 5a of the outer insulating sheath 5, the shield stopper 11 is located in a predetermined position on the shielded cable 1. In this condition, the shield stopper 11 extends or stretches over the outer insulating sheath 5 and the braid 4 in such a manner that the larger-diameter portion 15 covers the outer insulating sheath 5 while the smaller-diameter portion 16 covers the braid 4. After the shield stopper 11 is thus positioned, a front end portion of the braid 4 is removed in such a manner that a predetermined length of the exposed braid 4 remains adjacent to the end surface 5a of the outer insulating sheath 5.

Then, the shield terminal 12 is fitted on the shielded cable 1 as shown in FIG. 2C. The shield terminal 12 is fitted on and moved along the shielded cable 1, so that the annular pressing portion 19 is inserted between the braid 4 and the inner insulating sheath 3, as shown in FIG. 3A. As a result, the braid 4 is held between the annular pressing portion 19 of the shield terminal 12 and the smaller-diameter portion 16 of the shield stopper 11.

After the shield terminal 12 is thus fitted on the shielded cable, the shield stopper 11 is pressed or compressed. This pressing operation is effected using a pressing jig 26 as shown in FIG. 2D, and this pressing jig 26 has a first pressing surface 26a and a second pressing surface 26b which are arranged in a stepped manner. The first pressing surface 26a is disposed in registry with the larger-diameter portion 15 of the shield stopper 11 (that is, the end portion of the outer insulating sheath 5) while the second pressing surface 26b is disposed in registry with the smaller-diameter portion 16 of the shield stopper 11 (that is, the braid 4 of the shielded cable 1), and in this condition the pressing operation is effected by the pressing jig 26.

The shield stopper 11 is pressed or compressed by this pressing operation. At this time, the first pressing surface 26a presses the larger-diameter portion 15 of the shield stopper 11, and simultaneously with this pressing, the second pressing surface 26b presses the smaller-diameter portion 16 of the shield stopper 11. FIG. 3 shows a condition after this pressing operation is effected. Since the larger-diameter portion 15 of the shield stopper 11 is pressed by the first pressing surface 26a of the pressing jig 26, an outer insulating sheath-side pressed portion 28, which bites into the outer insulating sheath 5 of the shielded cable 1, is formed at the larger-diameter portion 15. As a result of the provision of this outer insulating sheath-side pressed portion 28, the outer insulating sheath 5 is firmly pressed against the braid 4, so that the outer insulating sheath 5 and the braid 4 are prevented from axial displacement with respect to each other.

At the same time, a braid-side pressed portion 29 is formed at the smaller-diameter portion 16 of the shield stopper 11. As a result of the provision of this braid-side pressed portion 29, the smaller-diameter portion 16 of the shield stopper 11 and the annular pressing portion 19 of the shield terminal 12 firmly hold the braid 4 therebetween, and therefore the annular pressing portion 19 of the shield terminal 12 and the braid 4 are positively contacted with each other, and the shield terminal 12 and the shielded cable 1 are connected together. In addition, because of the provision of the braid-side pressed portion 29, the pressed annular pressing portion 19 of the shield terminal 12 bites into the inner insulating sheath 3 of the shielded cable 1, and the shield terminal 12 is fixed to the shielded cable 1 by this biting. The smaller-diameter portion 16 of the shield stopper 11, having the braid-side pressed portion 29, covers and protects the braid 4, and therefore the braid 4 will not be damaged or torn and cut.

In this end processing, the shield stopper 11 serves to prevent the displacement of the outer insulating sheath 5 and the braid 4 with respect to each other, and also serves to prevent the braid 4 from being damaged by the pressing force, and the stopper ring 6 and the shield pipe 8, required in the conventional construction for achieving these functions, are not needed. Therefore, the number of the component parts is reduced. And besides, the outer insulating sheath-side pressed portion 28, which prevents the displacement of the outer insulating sheath 5 and the braid 4 with respect to each other, and the braid-side pressed portion 29, which causes the braid 4 and the annular pressing portion 19 of the shield terminal 12 to be connected together, are formed by one pressing operation, and therefore the number of the pressing operations is reduced, and the end processing can be effected rapidly.

The step portion 17, formed at the shield stopper 11, serves to position the shield stopper 11 relative to the shielded cable 1, and therefore the shield stopper 11 can be pressed in the predetermined position. Therefore, any jig for positioning and fixing the shield stopper 11 is not necessary, and the operability is enhanced.

Before the shield stopper 11 is mounted on the shielded cable 1, the rubber plug 13 is mounted on the shielded cable 1, and therefore the rubber plug 13 will not interfere with the other parts in contrast with the case where the rubber plug 13 is mounted in a later step, and damage of the rubber plug 13 due to such interference will not occur.

After the above end processing is effected, the end portion of the shielded cable 1 is mounted in the housing 21, thus producing the connector 14. FIGS. 4 and 5 show this connector 14, and the end portion of the shielded cable 1, subjected to the above processing, is received in the housing 21. A mounting seat 31 for mounting on the electric equipment is formed at the housing 21 intermediate opposite ends thereof.

In this connector 14, an under holder 30 is mounted on a front end of the housing 21, and the seal ring 25 is fixedly held between the housing 21 and the under holder 30. The half-split corrugate holder 24 is assembled and mounted at the rear end portion of the housing 21, and by doing so, the corrugated tube 23 is fixed to the housing 21.

The shield contact 22 is provided within the housing 21, and is curved to provide a spring force (resilient force). The shield contact 22 resiliently contacts the annular contact portion 20 of the shield terminal 12. Because of this contact, the braid 4 of the shielded cable 1 and the shield contact 22 are connected together through the shield terminal 12. Although not shown in the drawings, the shield contact 22 extends through the interior of the housing 21, and its distal end portion is reaches the mounting seat 31 of the housing 21.

The connector 14 of this construction is mounted on the electric equipment by inserting the mounting seat 31 into a mounting hole 33 in a casing 32 of the electric equipment. When the connector is thus mounted, the distal end portion of the shield contact 22 contacts the casing 32. The casing 32 of the electric equipment is made of electrically-conductive metal, and as a result of this contact, the braid 4 of the shielded cable 1 is electrically connected to the casing 32. Therefore, the grounding is effected.

Alternatively, the whole of the housing 21 may be plated with an electrically-conductive material (Zn plating film on a Cu undercoat), in which case the shield contact 22 is contacted with the electrically-conductive plating film, and the braid 4 is electrically connected to the casing 32 through the electrically-conductive plating film.

In FIG. 4, reference numeral 34 denotes an electrical terminal connected to the end of the conductor 2 of the shielded cable 1.

As described above, according to the first aspect of the present invention, the shield stopper serves to prevent the outer insulating sheath and the braid from displacement with respect to each other, and also serves to prevent the braid from being damaged by the pressing force, and therefore a stopper ring and a shield pipe, heretofore required for achieving these functions, are not necessary, and the number of the component parts is reduced. And besides, the pressed portion, serving to prevent the displacement of the outer insulating sheath and the braid with respect to each other, and the pressed portion, serving to connect the braid and the shield terminal together, can be formed by one pressing operation, and therefore the number of the pressing operations is reduced.

According to the second aspect of the present invention, the shield stopper is positioned relative to the shielded cable by the abutment of the step portion of the shield stopper against the end surface of the outer insulating sheath, and therefore the shield stopper can be pressed in the predetermined position, and any jig for positioning the shield stopper is not required.

According to the third aspect of the present invention, the shield stopper is pressed or compressed, and by doing so, the pressing for preventing the displacement of the outer insulating sheath and the braid with respect to each other, and the pressing for connecting the braid and the shield terminal together, can be effected simultaneously, and therefore, these pressed portions can be formed by one pressing operation, and the number of the pressing operations is reduced, and the processing can be carried out rapidly.

According to the fourth aspect of the present invention, the rubber plug is mounted before the shield stopper is mounted, and therefore the rubber plug will not interfere with the other parts, such as the shield stopper, and the rubber plug will not be damaged.

What is claimed is:

1. A construction of processing an end portion of a shielded cable, the construction comprising:
    a cable comprising:
        a conductor,
        an inner insulating sheath covering the conductor,
        a braid provided around the inner insulating sheath, and
        an outer insulating sheath covering the braid;
        wherein an end portion of the braid is exposed;
    an annular shield stopper mounted on and extending over an end portion of the outer insulating sheath and the end portion of the braid, the shield stopper including a first pressed portion that presses the end portion of the outer insulating sheath, and a second pressed portion that presses the end portion of the braid; and
    a shield terminal comprising an annular pressing portion which is located between the braid and the inner insulating sheath, the annular pressing portion including a third pressed portion that presses the inner insulating sheath;

wherein the braid is sandwiched between the second pressed portion and the third pressed portion.

2. The construction of claim 1, wherein the shield stopper includes an annular larger-diameter portion covering an end portion of the cable, an annular smaller-diameter portion covering the end portion of the braid, and a step portion interconnecting the larger-diameter portion and the smaller-diameter portion, the step portion being abutted against an end surface of the end portion of the outer insulating sheath to position the shield stopper.

3. A method of processing an end portion of a cable, the method comprising steps of:

providing a cable comprising a conductor, an inner insulating sheath covering the conductor, a braid provided around the inner insulating sheath, and an outer insulating sheath covering the braid, wherein an end portion of the braid is exposed; an annular shield stopper; and a shield terminal comprising an annular pressing portion;

mounting the shield stopper on the cable such that the shield stopper covers an end portion of the outer insulating sheath and the end portion of the braid;

inserting the pressing portion of the shield terminal between the braid and the inner insulating sheath; and pressing the shield stopper so that the outer insulating sheath and the braid are simultaneously pressed through the shield stopper.

4. The method of claim 3, further comprising a step of mounting a rubber plug on the outer insulating sheath so that the rubber plug is held in intimate contact with an outer peripheral surface of the outer insulating sheath, before the step of mounting.

* * * * *